United States Patent [19]

Bos

[11] 4,076,438
[45] Feb. 28, 1978

[54] TIE MEMBERS FOR ANGLED JOINTS

[75] Inventor: André Bos, Toulouse, France

[73] Assignee: Technal International S.A., Toulouse Cedex, France

[21] Appl. No.: 772,995

[22] Filed: Feb. 28, 1977

[51] Int. Cl.² .............................................. F16D 7/04
[52] U.S. Cl. .................................... 403/402; 403/297
[58] Field of Search ............... 403/401, 402, 295, 297, 403/231; 52/475, 476, 656

[56] References Cited

U.S. PATENT DOCUMENTS

| | | | |
|---|---|---|---|
| 2,290,430 | 7/1942 | Heiser | 403/297 |
| 3,294,429 | 12/1966 | Halip | 403/295 |
| 3,709,533 | 1/1973 | Walters | 52/656 X |
| 3,848,390 | 11/1974 | Anderson | 403/401 X |
| 3,967,910 | 7/1976 | Tollefsrud | 403/402 |

FOREIGN PATENT DOCUMENTS

| | | | |
|---|---|---|---|
| 2,103,504 | 7/1972 | Germany | 403/297 |
| 2,257,875 | 5/1974 | Germany | 52/656 |

*Primary Examiner*—Andrew V. Kundrat
*Attorney, Agent, or Firm*—Shlesinger, Arkwright, Garvey & Dinsmore

[57] ABSTRACT

This invention relates to a tie member which enables an angle joint to be produced between two obliquely cut hollow members, and consists of two non-deformable parts each of which has two arms adapted to fit into one or other of the hollow members to be joined, and means for moving one part relative to the other to enable them to be moved apart. One of the parts includes two retractable plungers which slide in openings in its arms and which are each subject to thrust from a spring which causes them to project towards the facing wall of one of the hollow members so that they will enter a bore formed in this wall. The arms of the two parts are resiliently connected together, in particular by the springs to prevent the parts from becoming detached from one another.

The tie member according to the invention enables a joint to be made under conditions of remarkable ease and simplicity, and automatically ensures that the hollow members are properly clamped against one another.

9 Claims, 8 Drawing Figures

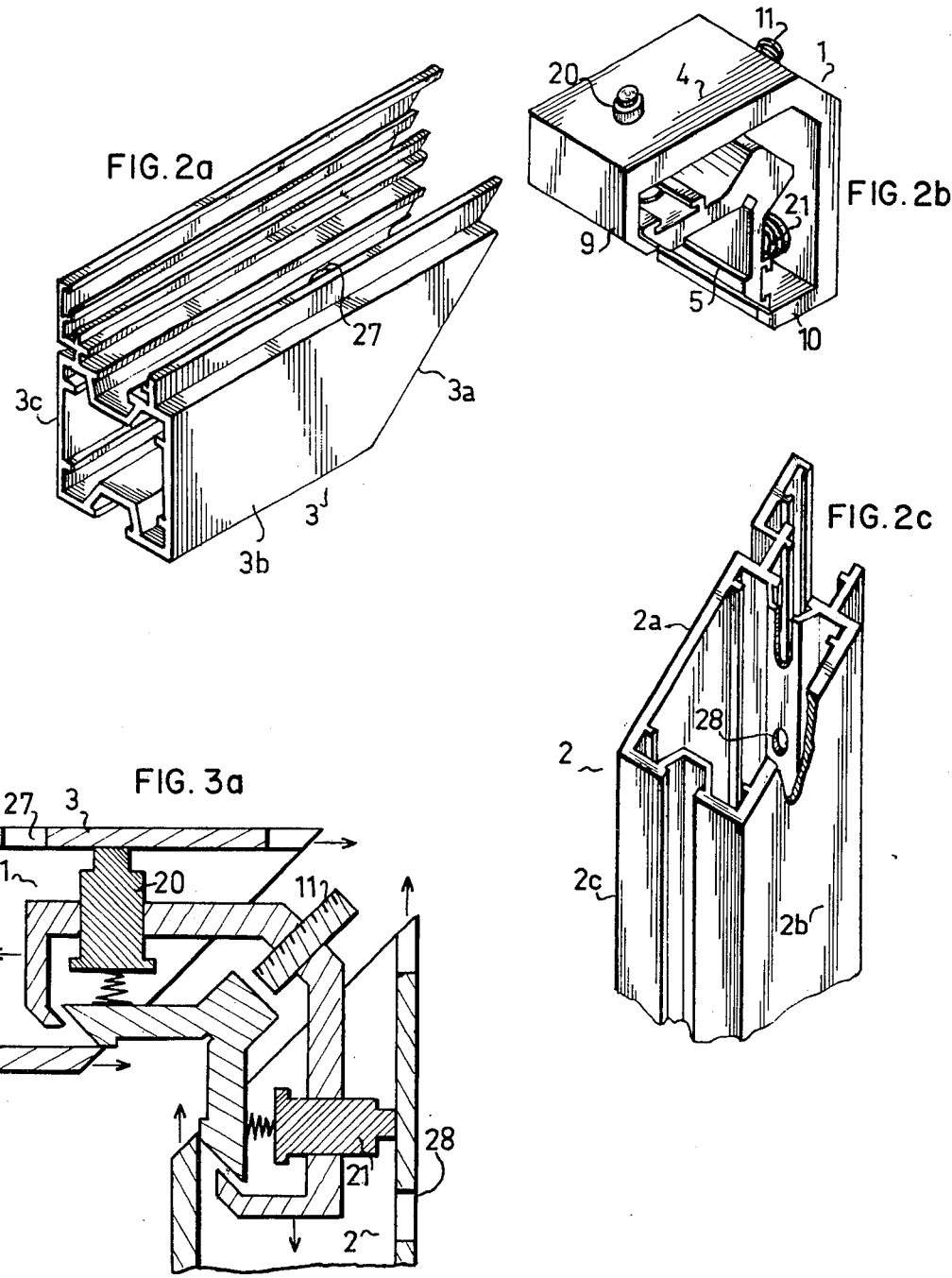

TIE MEMBERS FOR ANGLED JOINTS

BACKGROUND OF THE INVENTION

The present invention relates to tie members for forming an angled joint between two obliquely cut hollow members. This joint may in particular be employed in the production of panel edgings and the fixed or moving frames of doors or windows, etc.

Joining systems are known which are made up of two clamping members which are inserted in the hollow members to be joined facing one another and are moved apart from one another to apply pressure to the walls of the hollow members and to clamp the latter in such a way that their obliquely cut edges bear against one another in the plane of junction.

One kind of system of this nature is for example described in U.S. Pat. specification no. 3,848,390. In this system, one of the clamping members is a deformable clip which provides the clamping action by means of the give afforded by its resilience and by means of the deformation which its is forced to undergo when moved in relation to the other locking member. The clip has engagement studs which enable it to slide along the hollow members. A drawback of systems of this kind is that they can only be used once, since, in the course of tightening up, the clip suffers permanent deformation which makes it unable to be removed and used again. Furthermore, the mechanical strength of the joints produced with these systems, in which the hollow members are held together by a resilient member, is relatively low.

What is more, the operation of fitting these systems is awkward to carry out. The system is in fact formed by two separate and independent clamping members which have to be inserted simultaneously in the hollow members in the correct respective positions while at the same time lining up the engagement studs of the clip opposite holes contained in the hollow members so that the said studs will engage in them as the two clamping members are moved apart.

Another kind of system, which is described in Belgian patent specification No. 692.401 for example, overcomes the disadvantage arising from the resilient clip by providing two non-deformable clamping parts which, when they are moved apart, apply pressure against the inner faces of the hollow members and clamp them in place without deforming. Screws are screwed into the hollow members to form abutments which enter grooves in that clamping part which is situated on the outside of the angle and prevent it from slipping relative to the hollow members. The mechanical strength of this system is good provided it is fitted with absolute correctness. In the event of the parts being faultily machined or the abutments being faultily positioned in the hollow members, it may be impossible to join the hollow members or it may be possible to form only an imperfect joint with a gap between the hollow members at the plane of junction. Furthermore, fitting this system is an operation which is lengthy and difficult and it calls for tapped holes to be provied in the hollow members at very precise positions, for the two clamping parts, which are separate and independent, to be held in position with respect to one another and to be inserted in the hollow members and to be so positioned that the aforementioned grooves in one of the parts lines up with the tapped holes in the hollow members, for the abutments to be screwed into these holes so that they enter the grooves and for the two parts to be moved apart so as to clamp the assembly.

One object of the invention is a tie member which is of the same general kind as those described above and which comprise two non-deformable parts, but which does not suffer from the drawbacks of such systems.

Another object is in particular to remove the danger of producing a defective joint by ensuring that the sections are suitably tightened against one another without the need for any special precautions to be taken.

A further object is to simplify the operation of fitting the tie member and to enable this to be done quickly.

Yet another object is to simplify the operation of preparing the hollow members by doing away with the need to tap the bores made in the members and by making it unnecessary for these bores to be positioned with extreme accuracy.

A still further object is to enable the tie member to be re-used.

SUMMARY OF THE INVENTION

To achieve the above and other objects, which will become apparent from a perusal of the following description, the tie member to which the invention relates, and which is intended to produce an angled joint between two obliquely cut hollow members, consists on the one hand of two non-deformable oppositely-faced parts and which each have two arms whose shape and included angle are suitable to enable them to fit into either of the hollow members to be joined, the arms of one part coming into place adjacent those walls of the hollow members which are situated on the inside of the angle and the arms of the other part coming into place adjacent the opposing walls situated on the outside of the angle and the corners of the two parts being situated in the vicinity of the plane of junction of the two hollow members. The tie member also includes means for moving one part relative to the other which are so arranged as to allow the parts to be moved apart by a pressure exerted where their corners are situated. In accordance with the present invention, on of said parts contains two retractable plungers one of which is carried by one arm and is arranged to slide substantially perpendicular thereto in an opening formed in said arm, and the other of which is carried by the other arm and slides in a similar fashion, each said plunger being associated with a spring which is arranged to cause said plunger to project from the appropriate arm towards the adjacent wall of the hollow member so that the plunger can enter and latch in a bore formed for the purpose in said wall, resilient means being arranged between the facing arms of said two parts in such a way as to form a resilient connection between said two parts to prevent them from becoming detached from one another.

As will be more clearly understood from the description the tie members forms a functional unit with no separate parts which is easy and quick to fit and which enables an impeccable joint to be produced which is endowed with excellent mechanical strength.

The joint is made as follows: - A bore, the position of which need not be very accurate, is first made in each hollow member. The plungers are made to retract by pressing on them and the arms of the two parts of the tie member are then easy to insert into the two hollow members simply by pressure without taking any special precautions, until the plungers latch into the bores in the members. The means for moving the parts apart are then operated and as the parts move apart they cause the hollow members to draw together until their obliquely cut edges press against one another. This effect is brought about by the aforementioned plungers, which act on the hollow members in the direction which brings them together in the way which will be explained in detail hereinafter. The part which carries the plungers is not in contact with the hollow members and its functions is to carry the plungers and to enable them to move with respect to the other part in the course of the moving apart operation. The fact that the two parts become clamped in the position in which they are farthest apart ensure that the two hollow members are very firmly fixed in position against one another with no possibility of a gap between them.

The aforementioned plungers may be carried either by the part which is intended to be positioned on the outside of the angle, or by the other part. However, they will preferably be provided in the first part since, being situated on the outside of the angle, the arms of this part are longer and it is easy to mount the plungers at the greatest possible distance from the corner, which increases the strength of the joint.

Furthermore, the means for moving one part relative to the other may consist of a pressure screw which is screwed into a tapped hole formed in one of the parts. This screw is arranged to lie on a line bisecting the angle formed by the two arms of the said part and one of its ends presses against the other part. The part which carries the screw may be the part situated on the outside of the angle or alternatively it may be that one situated on the inside.

BRIEF DESCRIPTION OF THE DRAWINGS

The way in which the tie member according to the invention operates, and its advantages, will be better understood from perusing the following detailed description and from studying the accompanying drawings, which show a preferred embodiment by way of non-limiting example. In the drawings:

FIGS. 2a, 2b, and 2c are schematic perspective views of such a member about to be fitted into hollow members, FIGS. 3a, 3b, 3c, and 3d are diagrams illustrating the procedure of forming the joint. In these diagrams the movement of the parts has been exaggerated to assist comprehension.

DETAILED DESCRIPTION OF PREFERRED EMBODIMENT

Figure 1:
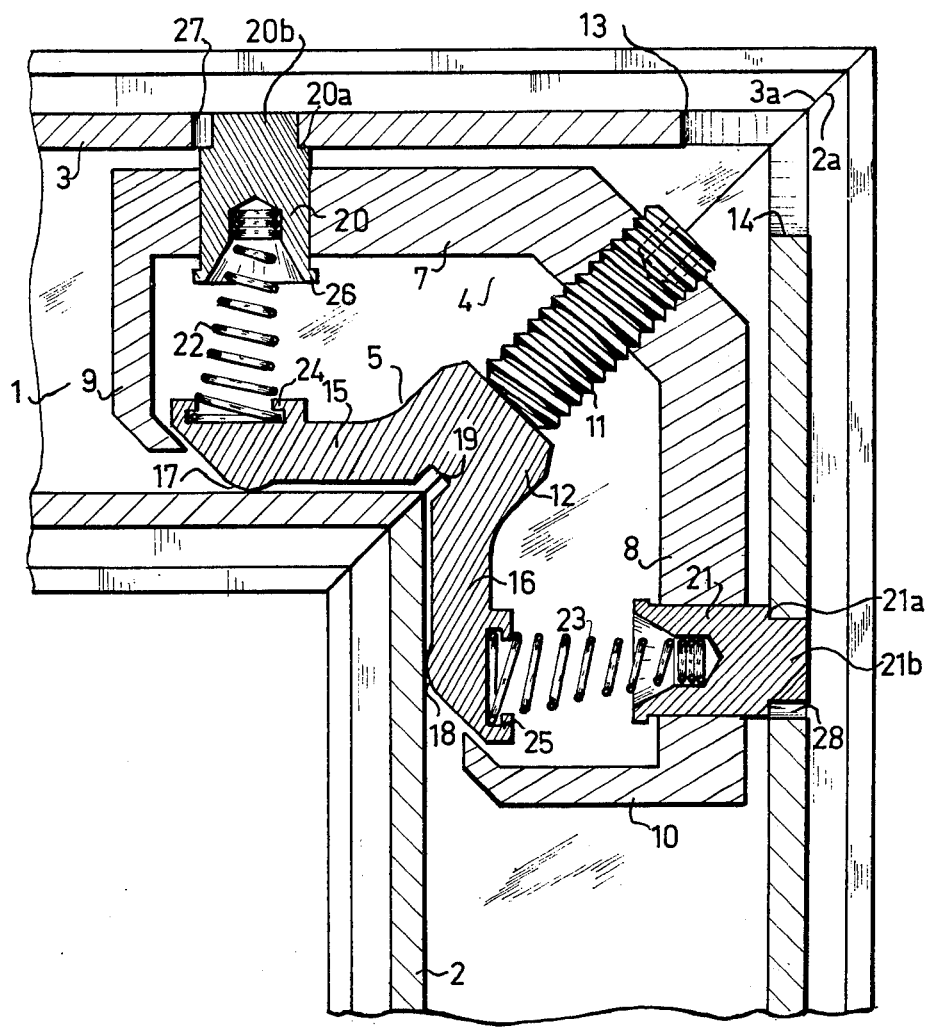
FIG. 1 is an axial section through an angle joint produced using a tie member according to the invention.

The tie member 1 shown in the drawings forms a compact assembly which involves no separate parts. In the embodiment shown, the member is intended to produce a right-angled joint between two tubular hollow members 2 and 3 having mitred edges 2a and 3a.

The tie member 1 consists of two parts 4 and 5 which are situated facing one another. Part 4 is adapted to fit into the hollow members on the outside of the angle and is made up of two indentical arms 7 and 8 which form between them as included angle equal to 90°. In the transverse direction the width of these arms is slightly less than the internal distance between the two transverse walls 2b and 2c or 3b and 3c of the hollow members.

At their free ends, the two arms 7 and 8 of part 4 each have a return 9 or 10 which is arranged to act as an end-of-travel stop for the other part 5 to restrict the degree to which the said parts can be moved apart.

In the present embodiment, the corner of part 4 is cut off to assist in the boring of a tapped hole into which a pressure-screw 11 is screwed. This pressure screw, which in the joint will lie along the junction plane of the hollow members, is intended to bear at one end against a bearing boss 12 situated opposite it which has a face orthogonal to the junction plane, against which the screw 11 is able to press. Cut-outs 13 and 14 formed in the hollow members enable the screw 11 to be operated, the screw being a socket screw in the present embodiment.

The part 5 is adapted to take up a position on the inside of the angle and it has two identical arms 15 and 16 whose included angle is equal to 90°. The transverse width of this part is slightly less than that of part 4.

At their ends, the arms 15 and 16 have bevelled edges which are able to abut against the aforementioned returns 9 and 10 of the other part to restrict the maximum distance between the parts.

On their faces adjacent the walls of the hollow members, arms 15 and 16 are each provided with a bulge 17 or 18 which is intended to press against the inside face of the corresponding wall of a hollow member. While the joint is being made, these bulges assist the hollow member and the arm to move relatively to one another tangentially irrespective of the condition of the surfaces of these items. Also, a small recess 19 is provided on the inside where the two arms meet so that part 5 will only bear against the hollow sections via its bulges.

In addition, the arms 7 and 8 of part 4 carry plungers 20 and 21 which are accommodated in openings formed in the arms and which are able to slide perpendicularly to the arms. Each plunger is associated with a spring 22 or 23 of conical shape, whose smaller diameter end is inserted in a recess formed in the end of the plunger and whose other, larger diameter end is engaged in a groove 24 or 25 provided in the facing arm 15 or 16 of part 5.

These springs 23 and 22 thus perform the dual function on the one hand of resiliently linking the two parts 4 and 5 to prevent them from becoming detached from one another while at the same time leaving them free to move with respect to one another, and on the other hand of thrusting against the plungers 20 and 21 to cause them to project from arms 7 and 8 towards the outer walls of hollow members 2 and 3.

In addition, each plunger has an abutment collar such as 26 which is formed near that end of the said plunger against which the spring thrusts (which end is the nearer to the other part), to restrict the travel of the plunger under the prompting of the spring.

In the present embodiment, each plunger has a shoulder 20a or 21a which defines an end section 20b or 21b of smaller diameter which is adapted to enter and latch in a bore 27 or 28 formed in one of the hollow sections. The remaining portion of the plunger is of larger diameter than the said bore, thus enabling the plunger to lock in the hollow section at the point where its shoulder is situated.

The structure of the tie member according to the invention as described above calls for an assembly procedure which is very much different from those of conventional systems and which enables this member to enjoy the advantages mentioned above.

FIGS. 3a, 3b, 3c and 3d are schematic views of the assembly procedure and will give a better understanding of how the various means of the invention operate.

In a first phase (FIG. 3a), the tie member 1 is inserted in the hollow sections 2 and 3, simply by pressure on he member parallel to the arrows shown in the Figure. Screw 11 is screwed out sufficiently far to allow parts 4 and 5 to come together enough for them to be inserted into the hollow members. At the beginning of insertion, pressure is applied to plungers 20 and 21 to depress them and to allow them to enter the hollow members.

At the end of the insertion (FIG. 3b), the plungers arrive at the points where bores 27 and 28 are situated in the hollow members and latch into these. A gap remains between the edges 2a and 3a of the hollow members. It should be noted that the positions of the bores 27 and 28 do not have to be very accurate and that any error affects only the size of the gap between the hollow members (the size of which gap is also affected by the initial position of the two parts 4 and 5 of the tie member).

In the second phase (FIG. 3c), screw 11 is operated by means of a socket spanner to displace the two parts 4 and 5 in the direction in which they move apart. This separating action causes parts 4 and 5 to move in a direction parallel to the junction plane. At a given moment, the bulges 17 and 18 on part 4 come into contact with the inside walls of the hollow members and the shoulders of plungers 20 and 21 come to bear against the sides of bores 27 and 28 (on the sides nearest the corner of the joint).

Figure 3B:
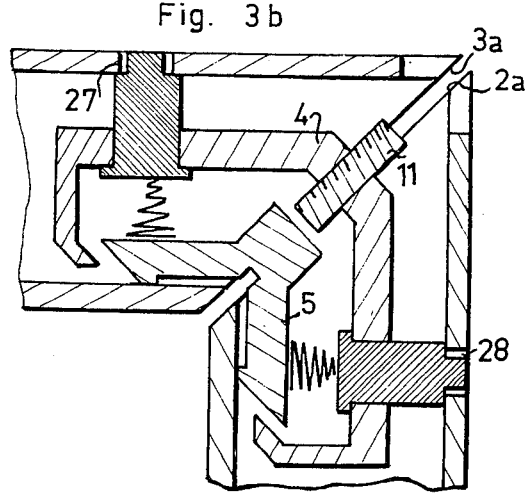
Figure 3C:
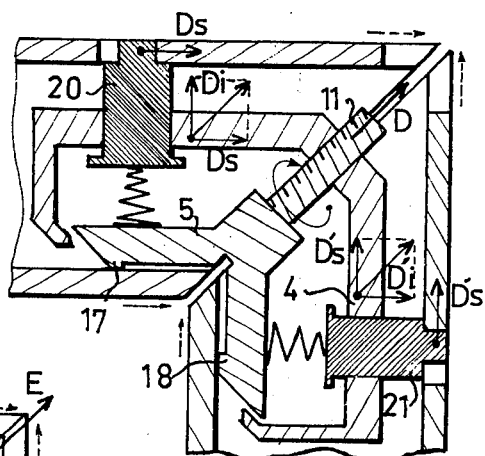
Figure 3D:
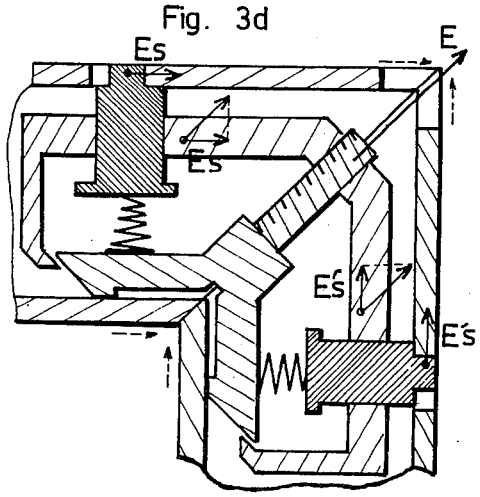

As indicated by symbols in FIG. 3c action on the pressure screw 11 gives rise to a movement by part 4 (vector D) which, at the points where the plungers are situated is made up of a movement D$s$ or D'$s$ parallel to the arm concerned, which is transmitted to the plunger carried by the arm, and of a movement D$i$ or D'$i$ perpendicular to this arm. The latter movements D$i$ and D'$i$ simply cause the arms and the walls of the hollow sections to move closer together as the said arms are caused to slide along the plungers without acting on them. Movements D$s$ and D'$s$ on the other hand are transmitted to the plungers and the plungers cause a parallel movement of the hollow members; the cut edges 2a and 3a thus move towards one another.

It should be noted that each plunger is in contact with the wall of one of the hollow members at the point where its shoulder is situated, on the one hand at one side of the cylindrical face of its end-section which presses against the thickness of the wall within the bore in the wall, and on the other hand via the radial face of the shoulder which bears against the inner face of the wall of the hollow member. The first contact is essential since it is this which transmits the force which draws together the sections. The second contact merely defines the exact position of the plunger parallel to its axis. It is preferable in practice for there to be a shoulder but is not indispensible since the movement of the hollow members towards one another does not depend on it.

When the cut edges 2a and 3a have come into contact with one another (FIG. 3d), action on the screw 11 produces a force E against the parts of the tie member which in turn gives rise to forces E$s$ and E'$s$ which tend to clamp the hollow members against one another at their edges. Tightening up screw 11 causes the two hollow members to become locked against one another under pressure with no gap and thus enables a very strong joint to be obtained. It can be seen that the member according to the invention is quick and easy to put into operation and requires no special precautions to be taken. Defects in the form of the parts or inaccuracy in the position of the bores in the hollow members does not prevent the joint from being made and does not adversely effect its strength or other qualities.

I claim:

1. A tie member for forming an angled joint between two obliquely cut hollow members, said member comprising two non-deformable oppositely-faced parts each having two arms whose shape and included angle are suitable to enable them to fit into either of the hollow members to be joined, the arms of one part coming into place adjacent those walls of the hollow members which are situated on the inside of the angle and the arms of the other part coming into place adjacent the opposing walls situated on the outside of the angle, and the corners of the two parts being situated near the plane of junction of the two hollow members, said tie member also having means for moving one part relative to the other which are so arranged as to enable the parts to be moved apart by a pressure exerted where their corners are situated, and wherein one of said parts contains two retractable plungers, one of which is carried by one arm and is arranged to slide substantially perpendicularly thereto in an opening formed in said arm, and the other of which is carried by the other said arm and slides in a similar fashion, spring members arranged to cause each said plunger to project from the appropriate arm towards the adjacent wall of one of the hollow members so that said plunger can enter and latch in a bore formed in said wall, and wherein means are arranged between the facing arms of said two parts to form a resilient connection between said two parts and prevent them from becoming detached from one another.

2. A tie member according to claim 1, wherein each said plunger has shoulder which defines an end section of smaller diameter which is adapted to enter and latch in the bore in one of the hollow members, the other portion of said plunger being of larger diameter than said bore so that said plunger will lock in the hollow member at the point where its shoulder is situated.

3. A tie member according to claim 1, wherein each said plunger has an abutment collar, which is arranged in the vicinity of its end nearer the other said part, to restrict its travel under the prompting of said spring.

4. A tie member according to claim 1, wherein said two arms of one of said parts each have at their free end a return which is adapted to act as an end-of-travel abutment for the end of the facing arm of the other said part, to restrict the degree to which said parts can move apart.

5. A tie member according to claim 1, wherein said part which is not provided with the plungers has, on each of its arms, a bulge which is adapted to press against the inner face of the appropriate wall of one of the hollow sections.

6. A tie member according to claim 1, wherein said plungers are carried by the said part which is adapted to take up a position on the outside of the angle.

7. A tie member according to claim 1, wherein said means for moving one said part relative to the other said part consist of a pressure screw which is screwed into a tapped hole formed in the said part which is adapted to take up a position on the outside of the angle, said screw being arranged on the line bisecting the angle formed by the two arms of the said part, and wherein the other said part has, at the point where its corner is situated, a bearing situated facing said pressure screw which has a face orthogonal to the junction plane against which the end of said pressure screw is intended to come to bear.

8. A tie member according to claim 1, wherein said means forming the resilient connection between the arms of the two parts comprise said spring members and said retractable plungers, said spring members being arranged between the arms of said parts at the points where said plungers are situated so as to thrust against the latter and to connect the parts resiliently.

9. A tie member according to claim 8 wherein each of said spring members comprises a spring of conical shape whose end of smaller diameter is inserted in a recess formed in the end of its said plunger and whose other, larger diameter end is engaged in a groove provided in the facing arm of said other part.

* * * * *